(12) United States Patent
Bull (10) Patent No.: US 9,637,078 B2
(45) Date of Patent: May 2, 2017

(54) OBJECT RESTRAINT SYSTEMS AND METHODS OF OPERATION THEREOF

(71) Applicant: FREESCALE SEMICONDUCTOR, INC., Austin, TX (US)

(72) Inventor: Kammie L. Bull, Austin, TX (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 14/541,772

(22) Filed: Nov. 14, 2014

(65) Prior Publication Data

US 2016/0137151 A1    May 19, 2016

(51) Int. Cl.
*B60R 21/0132* (2006.01)
*B60R 21/02* (2006.01)
(Continued)

(52) U.S. Cl.
CPC ............ *B60R 21/0132* (2013.01); *B60N 3/10* (2013.01); *B60N 3/106* (2013.01); *B60N 3/108* (2013.01);
(Continued)

(58) Field of Classification Search
CPC .......... B60N 3/10; B60N 3/101; B60N 3/106; B60N 3/108; B60R 2011/0071; B60R 21/0132; B60R 2021/01322; B60R 2021/01327; B60R 2021/168; B60R 21/026; B60R 21/06; B60R 21/08;
(Continued)

(56) References Cited

U.S. PATENT DOCUMENTS 6,004,084 A * 12/1999 Moker ............... B60P 7/065
                                                                          280/749
6,217,112 B1    4/2001 Linsenmeier et al.
(Continued)

FOREIGN PATENT DOCUMENTS

EP    2084686 B1    6/2013
WO    2009137582 A1    11/2009

OTHER PUBLICATIONS

Freescale Semiconductor, Inc., Airbag Systems: Automotive Safety Systems, Fact Sheet, pp. 1-2, May 2012.
(Continued)

*Primary Examiner* — Laura Freedman
(74) *Attorney, Agent, or Firm* — Sherry W. Schumm (57) ABSTRACT

Embodiments include object restraint systems and methods of their operation. The system is contained in a vehicle with a passenger compartment, and includes sensor and processing subsystems, a vessel, a restraint mechanism, and an actuator. The sensor subsystem produces a sensor signal indicating a magnitude of a sensed condition, and the processing subsystem asserts an actuator signal when the sensor signal indicates that a triggering condition has occurred. The vessel is configured to hold one or more inanimate objects. For example, the vessel may include a cupholder, a lidded or open compartment, a cargo area, or another storage space that is distinct from the passenger compartment. The actuator receives the actuator signal and activates the restraint mechanism in response to assertion of the actuator signal. The restraint mechanism, when activated, is configured to retain the object(s) within the vessel and to restrict the object(s) from entering the passenger compartment.

18 Claims, 6 Drawing Sheets

(51) Int. Cl.
    *B60R 21/214*     (2011.01)
    *B60R 21/232*     (2011.01)
    *B60N 3/10*     (2006.01)
    *B60R 21/16*     (2006.01)
    *B60R 11/00*     (2006.01)

(52) U.S. Cl.
    CPC .......... *B60R 21/026* (2013.01); *B60R 21/214* (2013.01); *B60R 21/232* (2013.01); *B60R 2011/0071* (2013.01); *B60R 2021/01322* (2013.01); *B60R 2021/0266* (2013.01); *B60R 2021/0273* (2013.01); *B60R 2021/168* (2013.01)

(58) Field of Classification Search
    CPC ................ B60R 21/214; B60R 21/232; B60R 2021/0266; B60R 2021/0273; B60R 2021/065
    See application file for complete search history.

(56) References Cited

U.S. PATENT DOCUMENTS

| | | | | |
|---|---|---|---|---|
| 6,230,948 B1* | 5/2001 | Steiger | ................... | B60N 3/102 224/539 |
| 6,547,117 B2* | 4/2003 | Glovatsky | .......... | B60H 1/00271 224/539 |
| 6,758,452 B1* | 7/2004 | Salenbauch | .............. | B60N 3/10 224/926 |
| 6,843,397 B2* | 1/2005 | Then | .................... | B60N 2/0224 224/552 |
| 7,648,114 B2* | 1/2010 | Åkerstedt | .............. | B60N 3/102 248/313 |
| 7,817,020 B2* | 10/2010 | Turnbull | ................ | B60Q 3/023 340/438 |
| 7,922,246 B2* | 4/2011 | Gale | ....................... | B60R 11/00 248/313 |
| 8,196,648 B2* | 6/2012 | Matsukawa | ............ | B60N 3/104 165/202 |
| 8,393,642 B2* | 3/2013 | Nakaya | ................. | B60R 21/214 180/271 |
| 8,485,581 B2* | 7/2013 | McKnight | ............... | B60R 11/00 296/24.34 |
| 8,870,144 B2* | 10/2014 | Zavattieri | ............. | B60N 3/105 248/311.2 |
| 9,114,394 B2* | 8/2015 | Yanez | ....................... | B01L 9/06 |
| 9,296,351 B1* | 3/2016 | Madrigal Medina | ... | B60R 21/06 |
| 2003/0096593 A1 | 5/2003 | Naboulsi | | |
| 2004/0031895 A1* | 2/2004 | Langhoff | ............... | B60N 3/105 248/311.2 |
| 2005/0205739 A1 | 9/2005 | DePue et al. | | |
| 2006/0243875 A1* | 11/2006 | Chen | ....................... | B60N 3/106 248/311.2 |
| 2011/0130111 A1* | 6/2011 | Crandall | ............... | B60R 21/013 455/404.1 |
| 2011/0199182 A1* | 8/2011 | Catlin | .................... | B60N 3/106 340/5.7 |
| 2015/0165954 A1* | 6/2015 | Oh | ......................... | B60N 3/106 62/3.3 |

OTHER PUBLICATIONS

Haskell, C., "Almost Deadly Sippy Cup Incident Warns Against Projectiles in Car", downloaded from http://thestir.cafemom.com/baby/120581/almost_deadly_sippy_cup_incident, pp. 1-3, May 2011.

\* cited by examiner

OBJECT RESTRAINT SYSTEMS AND METHODS OF OPERATION THEREOF

TECHNICAL FIELD

Embodiments of the subject matter described herein relate generally to systems and apparatus for restraining objects, and particularly to systems contained within vehicles designed for transporting people, and methods of operation thereof.

BACKGROUND

Automobile safety has increased dramatically over the years, particularly with respect to minimizing passenger injuries in the event of a collision. For example, major safety improvements have included the invention of seat belts, enhanced braking systems, collapsible steering columns, airbags, and improved crumple zones, among other things. These advancements in passenger safety technologies have significantly reduced the risk of injury from impact with vehicle components that are exposed within the passenger compartment. However, these technologies fail to address the well documented risk of injury from objects that may become projectiles within the passenger compartment in the event of a collision. Accordingly, what are needed are systems and methods for better protecting vehicle passengers from injury from projectiles during collisions.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the inventive subject matter include vehicle-borne object restraint systems and methods of operation of such systems. In a vehicle that includes at least one "vessel" for holding objects (i.e., inanimate objects that are not secured to the vehicle), an embodiment of a vehicle-borne object restraint system includes a sensor subsystem, a processing subsystem, a vessel, a restraint mechanism, and an actuator. The sensor subsystem produces signals indicating the magnitudes of one or more sensed conditions (e.g., acceleration, deceleration, force, pressure, and so on), and the processing subsystem asserts an actuator signal when the magnitudes indicate that a triggering event (e.g., a collision or other event) has occurred. The actuator receives the actuator signal and activates the restraint mechanism in response. The restraint mechanism, once activated, is configured to retain object(s) within the vessel and to restrict the object(s) from entering the passenger compartment. In this way, the object(s) within the vessel are less likely to become potentially-injurious projectiles when a triggering event occurs.

Although the embodiments discussed herein are particularly applicable to implementation of an object restraint system within an automobile, those of skill in the art would understand, based on the description herein, that embodiments of object restraint systems also may be implemented in other types of vehicles used to transport people. For example, embodiments of object restraint systems may be implemented in trucks, busses, trains, aircraft (e.g., airplanes), spacecraft, boats, ships, and so on. Further, although embodiments are discussed that include detecting a "collision," and activating a restraint mechanism in response to detecting the collision, those of skill in the art would understand, based on the description herein, that embodiments also include detecting other triggering events as well, such as excessive turbulence or vehicle bumping, excessive G-forces, excessively-forceful application of a braking mechanism, and so on.

According to various embodiments, a collision or other triggering event may be detected based on a change of momentum of the vehicle that exceeds a threshold, although a collision or other triggering event may be detected using other sensed conditions, as well. As used herein, a "change of momentum" may include a linear acceleration or deceleration, and/or an angular acceleration or deceleration. Accordingly, a sensor subsystem configured to detect momentum or change of momentum may include accelerometers, gyroscopes, magnetometers, pressure sensors, and other types of sensors that are configured to sense phenomenon that is indicative of momentum or change of momentum along any one or more axes. Along those lines, the term "collision," as used herein, includes frontal, side, rear, top, and bottom vehicle collisions, and rollover accidents.

Figure 1:
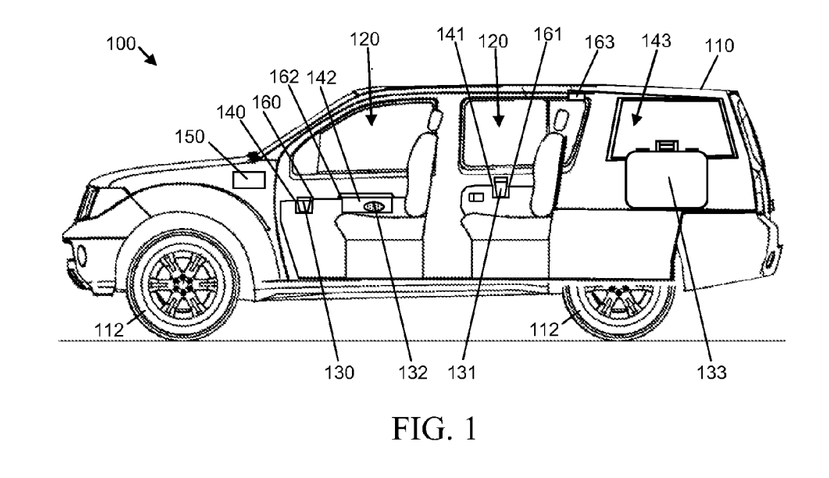
FIG. 1 is a cross-sectional side view of a vehicle with an on-board object restraint system, in accordance with an example embodiment.

FIG. 1 is a cross-sectional side view of a vehicle 100 with an on-board object restraint system, in accordance with an example embodiment. The components of the vehicle 100 are contained within the vehicle body 110, which essentially defines the vehicle's shape. Wheels 112 also are coupled to the vehicle body 110, which enables the vehicle 100 to move.

A primary function of the vehicle 100 is for transporting people. Accordingly, the vehicle 100 includes a passenger compartment 120 with seats within which the passengers may sit during transport. In addition, apparatus for controlling the vehicle 100 (e.g., the steering wheel, acceleration and brake pedals, gear shifter, and so on) and apparatus for monitoring the vehicle's operation (e.g., speedometer, fuel indicator, and so on) are accessible to the vehicle's driver within the passenger compartment 120. As used herein, the "passenger compartment" means an open area within the vehicle body 110 in which people are intended to be present while the vehicle 100 is being operated.

A secondary function of the vehicle 100 is for transporting objects, such as objects 130, 131, 132, 133, which are not fastened to the vehicle 100. For example, objects 130-133 may be placed in any of a number of "vessels" that are coupled to the vehicle 100, where each "vessel" is configured to hold one or more objects 130-133. As used herein, a "vessel" may include any definable area that is configured to hold one or more objects, as opposed to being configured to hold passengers of the vehicle. Each vessel is distinct from the passenger compartment 120, although each vessel includes one or more openings into the passenger compartment 120. For example, vessels within vehicle 100 include cupholders 140, 141, a lidded compartment 142 within a center console, and a cargo area 143 located behind the passenger compartment 120. Although not shown in FIG. 1, other vessels may include a glove compartment and other open or lidded compartments that have openings into the passenger compartment 120.

Vehicle 100 also includes an object restraint system, which is configured to restrain objects (e.g., objects 130-133) within vessels 140-143 (or other vessels) when a sensed change of momentum of the vehicle 100 exceeds a threshold, in accordance with an embodiment. Accordingly, the object restraint system may reduce the likelihood that objects 130-133 within the vessels 140-143 may become projectiles within the passenger compartment 120 under conditions of extreme momentum change (e.g., during collisions).

According to an embodiment, the object restraint system includes an event detection and restraint activation system 150, which is configured to sense momentum and/or change of momentum of the vehicle 100 along one or more axes, and to determine whether the sensed momentum or change of momentum exceeds a threshold. The event detection and restraint activation system 150 includes a sensor subsystem and a processing subsystem, as will be described in more detail later in conjunction with FIG. 2. The sensor subsystem includes one or more sensors, which may be deployed in multiple locations around the vehicle body 110. The sensors of the sensor subsystem produce sensor signals, which are received and interpreted by the processing subsystem.

The processing subsystem is communicatively coupled with a plurality of actuators and restraint mechanisms 160, 161, 162, 163 that are coupled with each of the vessels 140-143. According to an embodiment, the processing subsystem is coupled to the actuators and restraint mechanisms 160-163 through hardwired connections. In an alternate embodiment, the processing subsystems may be coupled to the actuators and restraint mechanisms 160-163 through wireless connections. Either way, the processing subsystem provides an actuator signal to each actuator and restraint mechanism 160-163, which may cause each actuator and restraint mechanism 160-163 to be activated, as described below.

When the processing subsystem determines, based on the received sensor signals, that a change of momentum of the vehicle along any of one or more axes exceeds a predetermined threshold, the processing subsystem asserts one or more of the actuator signals that the processing system provides to the actuator and restraint mechanisms 160-163. As its name implies, each actuator and restraint mechanism 160-163 includes an actuator and a restraint. Assertion of an actuator signal causes an actuator to activate a corresponding restraint mechanism. When activated, the restraint mechanism functions to retain object(s) within the vessel to which the restraint mechanism is coupled, and thus to restrict the object(s) from entering the passenger compartment as potential projectiles.

Although the event detection and restraint activation system 150 is depicted as a singular unit within the vehicle's engine compartment, the event detection and restraint activation system 150 may include multiple components that are distributed in various areas within the vehicle 100, including a plurality of sensors that are positioned at various locations around the vehicle 100. Further, although particular examples of vessels 140-143 are depicted and described herein, it is to be understood that a vehicle may include more, fewer, or different types of vessels, in alternate embodiments. For example, in an aircraft, bus, or train, a vessel may include an overhead storage compartment, a food/beverage cart bay, or another type of storage area.

Figure 2:
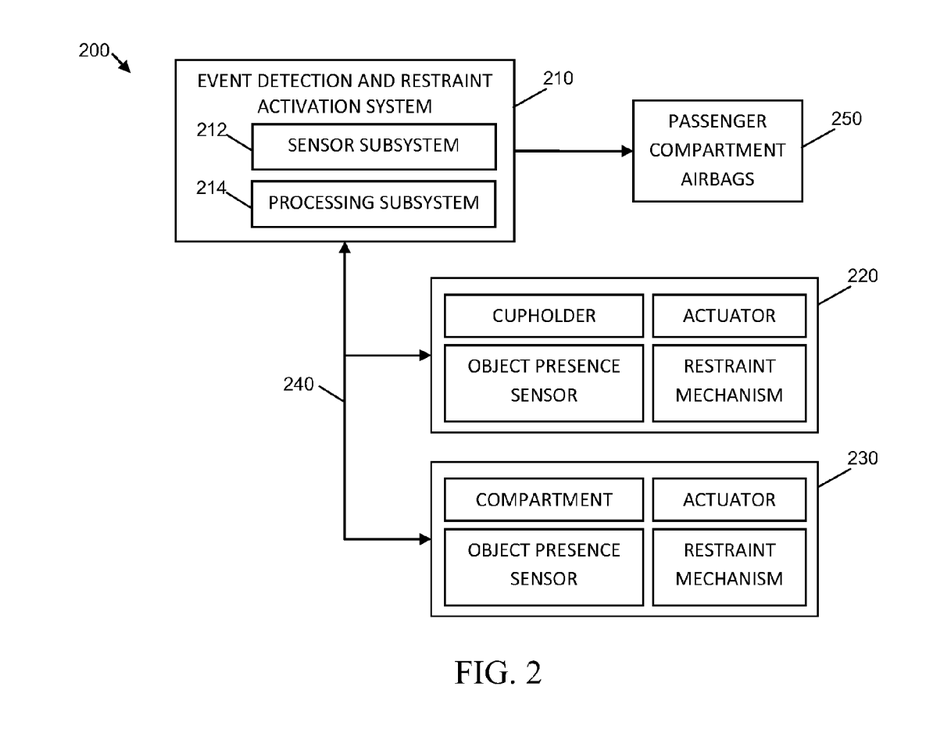
FIG. 2 is a block diagram of an object restraint system, in accordance with an example embodiment.

FIG. 2 is a block diagram of an object restraint system 200, in accordance with an example embodiment. The object restraint system 200 may be fully contained within a passenger-carrying vehicle, such as a motor vehicle (e.g., vehicle 100, FIG. 1), a train, an airplane, a boat, a ship, and so on. According to an embodiment, the object restraint system 200 includes an event detection and restraint activation system 210 and one or more restraint-equipped vessels 220, 230, only two of which are shown in FIG. 2. More specifically a first restraint-equipped vessel 220 is a cupholder-type vessel, and a second restraint-equipped vessel 230 is a compartment-type vessel. As discussed previously, systems may include other types of restraint-equipped vessels, as well, such as a cargo area (e.g., cargo area 143, FIG. 1), a bay, or another type of object storage area.

Event detection and restraint activation system 210 includes a sensor subsystem 212 and a processing subsystem 214, in an embodiment. The sensor subsystem 212 includes one or more sensors that are coupled to the vehicle, and which singularly or in combination are configured to produce signals indicating momentum or change of momentum of the vehicle. In addition or alternatively, the sensors may be configured to indicate that an object has collided with the vehicle, or that the vehicle has collided with an object. Indications of momentum may include, for example, indications of linear and/or angular velocity along one or more axes (e.g., orthogonal x-, y-, and z-axes). Indications of change of momentum may include, for example, indications of changes in linear and/or angular velocity along one or more axes.

In an embodiment, the sensor subsystem 212 may include one or more accelerometers and/or gyroscopes for sensing linear and angular acceleration, respectively. For example, the accelerometers and/or gyroscopes may include microelectromechanical system (MEMS) sensors, or other types of accelerometers and/or gyroscopes. In addition or alternatively, the sensor subsystem 212 may include one or more wheel speed sensors and/or brake pressure sensors, which produce signals indicating the angular velocity of the wheels and/or the pressure applied to the brakes, respectively. In addition or alternatively, the sensor subsystem 212 may include one or more impact sensors and/or side (door) pressure sensors, which produce signals indicating that a collision between the vehicle and an external object may have occurred.

The processing subsystem 214 includes one or more microprocessors and/or other processing components. In addition, the processing subsystem 214 may include memory, various inputs/outputs (I/Os), busses, and other hardware that enables the processing subsystem 214 to perform its primary function. The components of the processing subsystem 214 may be included within a single module, or within multiple distributed modules that are communicatively coupled together. The primary function of the processing subsystem 214 is to receive and monitor the sensor signals from the sensors of the sensor subsystem 212, to determine whether or not the sensor signals indicate that a collision or other triggering event is occurring. For example, other triggering events may include a rapid decrease in the angular speed of the wheel(s), excessive pressure being applied to the brakes, excessive turbulence or vehicle bumping, excessive G-forces, and so on. When the processing subsystem 214 determines that a collision or other triggering event is occurring, the processing subsystem 214 may assert one or more actuator signals.

For example, the processing subsystem 214 may determine the rate of linear or angular acceleration or deceleration from the sensor signals, and when the rate of linear or angular acceleration or deceleration exceeds a predetermined threshold, the processing subsystem 214 may assert one or more of the actuator signal(s). Alternatively, the processing subsystem 214 may determine that the rate of angular deceleration of the wheel(s) exceeds a predetermined threshold, and/or that the applied braking force exceeds a predetermined threshold, in which case the processing subsystem 214 may assert one or more of the actuator signal(s). In still another embodiment, the processing subsystem 214 may determine that an impact sensor has detected that an object (e.g., another automobile) has impacted the vehicle.

In some embodiments, the processing subsystem 214 may assert a subset of the actuator signals when the rate of linear or angular acceleration or deceleration exceeds a first predetermined threshold, and may assert another subset of the actuator signals when the rate of linear or angular acceleration or deceleration exceeds a second and higher predetermined threshold. For example, when the processing subsystem 214 determines that a rate of linear deceleration (and/or sensor signals from the wheel speed sensors or the brake pressure sensors) indicates that the driver of the vehicle is braking with more than conservative force, the processing subsystem 214 may assert actuator signals associated with cupholder-type vessels (e.g., cupholders 130, 131), and may refrain from asserting actuator signals associated with vessels that are equipped with airbag restraint mechanisms and/or lidded compartments. However, when the processing subsystem 214 determines that a rate of linear deceleration or angular acceleration indicates that a collision is occurring, the processing subsystem 214 may assert actuator signals associated with all of the restraint-equipped vessels 220, 230.

In still another embodiment, the vehicle also may include an airbag deployment system that is configured to detect a collision of the vehicle, and to deploy one or more passenger compartment airbags 250 in response to detecting the collision. The passenger compartment airbags 250 are configured to cushion passengers within the passenger compartment from impacting vehicle components that are exposed within the passenger compartment (e.g., the steering wheel, door interiors, windshield, window, and so on). However, the passenger compartment airbags 250 are not specifically configured to restrain objects within the passenger compartment from becoming potentially-injurious projectiles. The airbag deployment system may be completely distinct from the object restraint system 200. Alternatively, the sensor subsystem 212 and the processing subsystem 214 may form portions of the airbag deployment system. In such an embodiment, the processing subsystem 214 may be config-ured to assert the actuator signals concurrently with asserting airbag deployment signals that cause deployment of one or more of the passenger compartment airbags 250.

Event detection and restraint activation system 210 is communicatively coupled to the restraint-equipped vessels 220, 230. For example, a communication medium 240 between the event detection and restraint activation system 210 and the restraint-equipped vessels 220, 230 may include a one-way or bi-directional bus, a series of conductors, and/or wireless communication components (e.g., wireless transmitters, receivers, and/or transceivers). The communication medium 240 is configured to communicate the activation signal from the event detection and restraint activation system 210 (or more specifically from processing subsystem 214) to the restraint-equipped vessels 220, 230. In addition, as will be described in more detail below, the communication medium 240 also may be configured to convey an object presence signal from the restraint-equipped vessels 220, 230 (or more specifically from object presence sensors) to the event detection and restraint activation system 210 (or more specifically processing subsystem 214).

In the illustrated embodiment, restraint-equipped vessel 220 is a cupholder-type vessel (referred to below as a restraint-equipped cupholder), which includes a cupholder, a restraint mechanism, and an actuator. The cupholder is sized and configured to receive a cup, can or bottle. The restraint mechanism is configured, when activated, to retain the cup, can or bottle with more than normal restraining force, where "normal restraining force" is any force that may be applied by the restraint mechanism when the actuator signal is not asserted (e.g., a force that loosely holds the cup, can or bottle in the cupholder so that it may be easily removed by a passenger). The actuator is configured to receive the actuator signal from the processing subsystem 212, and when the actuator signal is asserted, to activate the restraint mechanism. For example, a restraint mechanism for a restraint-equipped cupholder may include a hinged clip (e.g., including hinges 340, 341 and clips 342, 343, FIGS. 3A, 3B), a pin (e.g., pins 440, 441, FIGS. 4A, 4B), a band that may be constricted firmly around the object within the cupholder, a bladder within the cupholder that may be inflated to retain the object within the cupholder, or some other type of suitable restraint mechanism.

Conversely, restraint-equipped vessel 230 is a compartment-type vessel (referred to below as a restraint-equipped compartment), which includes a compartment, a restraint mechanism, and an actuator. The compartment is sized and configured to receive one or more objects. For example, the compartment may have a volume of less than two cubic feet, in an embodiment. In another embodiment, the compartment may have a volume of less than five cubic feet. In yet another embodiment, the compartment may have a volume of less than 100 cubic feet. In any event, the restraint mechanism is configured, when activated, to retain the object(s) within the compartment when the actuator signal is asserted. The actuator is configured to receive the actuator signal from the processing subsystem 212, and when the actuator signal is asserted, to activate the restraint mechanism. For example, a restraint mechanism for a restraint-equipped compartment may include a hinge (e.g., hinge 530, 542, FIG. 5), a latch (e.g., latch 540, FIG. 5), a curtain airbag (e.g., airbag 630, 732, FIGS. 6, 7), or some other mechanism.

According to an embodiment, restraint-equipped vessels 220, 230 each also may include an object presence sensor, which is configured to detect the presence of one or more objects within the vessel (e.g., within the cupholder or compartment). For example, an object presence sensor may include a pressure sensor, a photoelectric sensor, a touch sensor, a proximity sensor, or another type of sensor that may detect the presence of one or more objects within a vessel. When an object presence sensor senses that one or more objects are present within the vessel, the object presence sensor asserts an object presence signal, which is communicated to the processing subsystem 212. Otherwise, when the object presence sensor senses that no objects appear to be present within the vessel, the object presence sensor may deassert the object presence signal. When the processing subsystem 214 determines, based on the object presence signal, that no object appears to be present within any particular vessel, the processing subsystem 214 may refrain from asserting the actuator signal for that particular vessel, even when a rate of linear or angular acceleration or deceleration exceeds a threshold, and/or even when the processing subsystem 214 determines that another type of triggering event has occurred.

As indicated previously, besides cupholder-type and compartment-type of vessels, a system may include other types of restraint-equipped vessels as well (e.g., a restraint-equipped cargo area, a restraint-equipped bay, and so on). Each of these alternative types of vessels also may include one or more actuators, one or more restraint mechanisms, and one or more object presence sensors. Further, although FIGS. 1 and 2 indicate that the various components of an object restraint system may be positioned in different locations within a vehicle (e.g., the sensor subsystem 212, the processing subsystem 214, and the restraint-equipped vessels 220, 230 may be in different locations within the vehicle), the various components of an object restraint system may be co-located, as well. For example, the sensor subsystem 212 and/or the processing subsystem 214 may be directly coupled to or may be integrally formed with the restraint-equipped vessels 220, 230, in some embodiments.

Various embodiments of restraint-equipped vessels now will be described in conjunction with FIGS. 3-6. The illustrated and described embodiments should not be interpreted to restrict the scope of the inventive subject matter only to those embodiments. Instead, as discussed previously, a system may include other types of restraint-equipped vessels, as well.

Figure 3A:
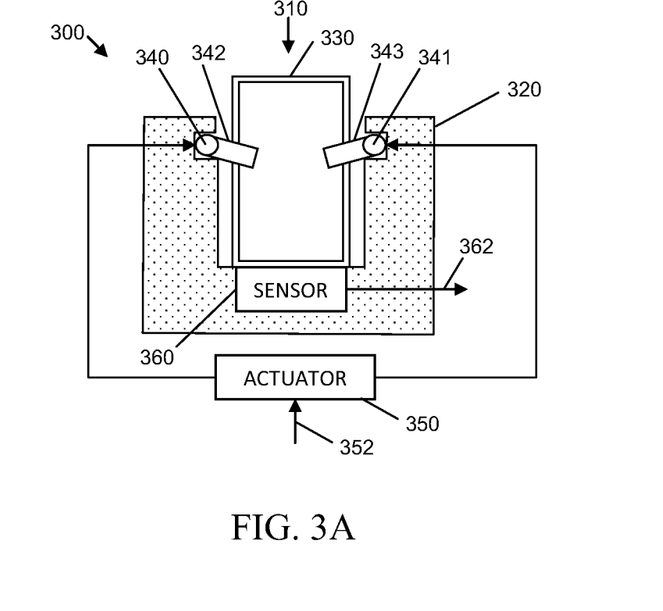
FIGS. 3A and 3B are cross-sectional and top views, respectively, of a restraint-equipped cupholder, in accordance with an example embodiment.
Figure 3B:
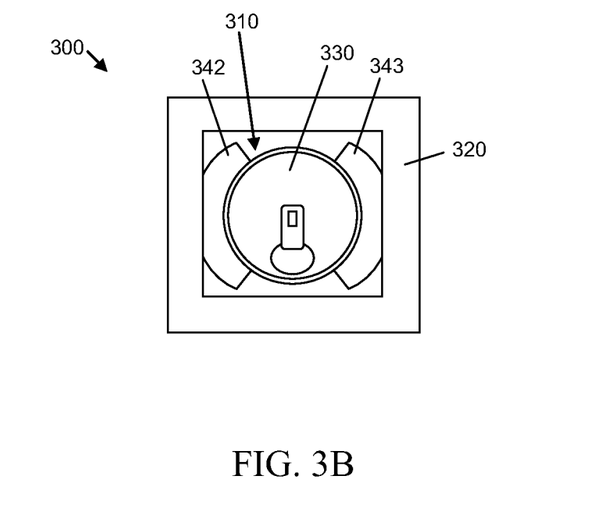

FIGS. 3A and 3B are cross-sectional and top views, respectively, of a restraint-equipped cupholder 300, in accordance with an example embodiment. Restraint-equipped cupholder 300 includes an opening 310 formed in a rigid body 320, where the opening 310 is generally sized to receive and retain a typical beverage container, such as can 330. In addition, restraint-equipped cupholder 300 includes two restraint mechanisms in the form of hinged clips, which are coupled to sidewalls of the opening 310. Each hinged clip includes a hinge 340, 341 coupled to the body 320, and a clip 342, 343 coupled to the hinge 340, 341. As can be seen more clearly in the top view of FIG. 3B, each clip 342, 343 may have a curved contact edge that is generally shaped to conform to can 330 or to another object with a circular cross section. Hinges 340, 341 each may include a torsion spring (or other type of spring), for example, so that the hinge 340, 341 may return to a default or equilibrium position in the absence of a force applied to the hinge 340, 341 (e.g., a force applied by an object inserted in the cupholder 300). Prior to actuation of the restraint-equipped cupholder 300, clips 342, 343 may be readily rotated by hinges 340, 341 using minimal force (e.g., minimal downward force to insert can 330 into opening 310), and the torsion on hinges 340, 341 may be sufficient to apply a normal restraining force to the can 330.

Restraint-equipped cupholder 300 also includes one or more actuators 350 that are configured to selectively alter the functioning of the hinged clips in response to the state of an actuator signal 352 received from an event detection and restraint activation system (e.g., system 210, FIG. 2). For example, when the actuator signal 352 is not asserted, actuator 350 may allow the hinged clips to operate normally without interference. Conversely, when the actuator signal 352 is asserted, actuator 350 may alter the operation of the hinged clips so that the hinged clips retain the can 330 in the opening 310 with greater than normal restraining force (i.e., actuator 350 may activate the hinged clips). For example, actuator 350 may increase the torque of the torsion springs of hinges 340, 341 so that the clips 342, 343 apply a significantly larger restraining force to the can 330 (e.g., from 10% to 200% larger than the normal restraining force). The hinges 340, 341 may be configured to provide feedback indicating a magnitude of applied torque, in an embodiment, so that actuator 350 may adjust the applied torque to a desired magnitude (e.g., a magnitude sufficient for the clips 342, 343 to hold but not crush the can 330). Alternatively, the clips 342, 343 may include pressure sensors (not shown) at their contact surfaces, so that the clips 342, 343 may provide feedback indicating a magnitude of pressure applied to the can 330. In a further embodiment, actuator 350 may lock the hinges 340, 341 into position, so that unusually high gravitational forces, inertial forces, and/or forces exerted by the can 330 on the clips 342, 343 during a collision or other triggering event do not cause the clips 342, 343 to become disengaged from either or both sides of the can 330.

In an embodiment, restraint-equipped cupholder 300 also may include an object presence sensor 360, which is configured to detect the presence of one or more objects (e.g., can 330) within the opening 310. For example, object presence sensor 360 may include a pressure sensor, a photoelectric sensor, a touch sensor, a proximity sensor, or another type of sensor that may detect the presence of one or more objects within opening 310. In still another embodiment, presence of an object within the opening 310 may be determined when hinges 340, 341 and clips 342, 343 are rotated from a resting position (e.g., a position when no object is inserted into opening 310 to apply a downward force on clips 342, 343). When object presence sensor 360 senses that one or more objects are present within the opening 310, the object presence sensor 360 asserts an object presence signal 362, which is communicated to the event detection and restraint activation system (e.g., system 210, FIG. 2), as discussed previously. Otherwise, when the object presence sensor 360 does not detect an object in opening 310, the object presence sensor 360 may deassert the object presence signal 362.

Figure 4A:
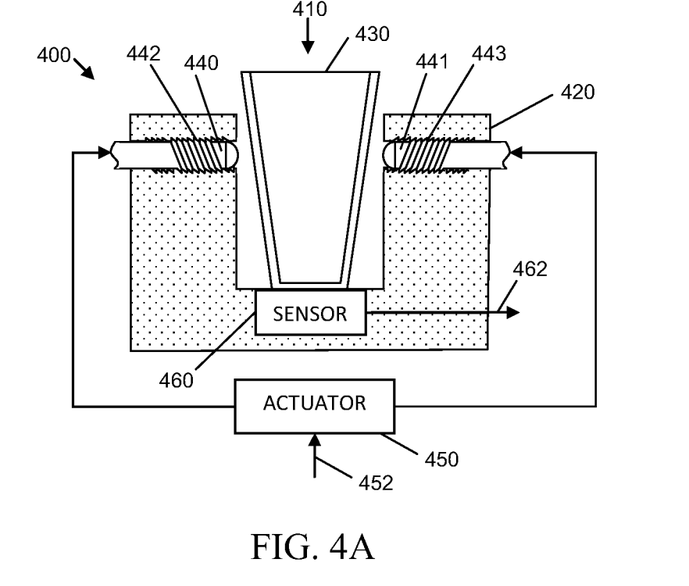
FIGS. 4A and 4B are cross-sectional side views of another embodiment of a restraint-equipped cupholder with a restraint in an undeployed state and a deployed state, respectively.
Figure 4B:
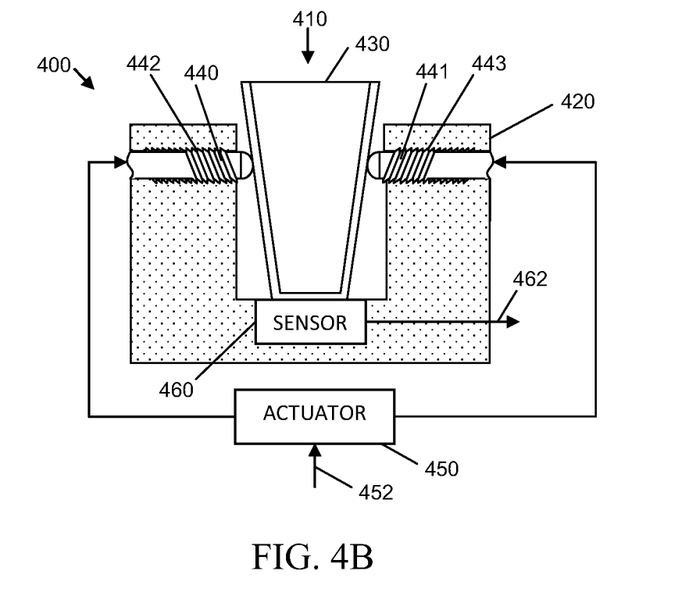

FIGS. 4A and 4B are cross-sectional side views of another embodiment of a restraint-equipped cupholder 400 with a restraint in an undeployed state (FIG. 4A) and a deployed state (FIG. 4B), respectively. Restraint-equipped cupholder 400 is similar to restraint-equipped cupholder 300, in that restraint-equipped cupholder 400 also includes an opening 410 formed in a rigid body 420, where the opening 410 is generally sized to receive and retain a typical beverage container, such as cup 430. Restraint-equipped cupholder 400 differs in that restraint-equipped cupholder 400 includes two "deployable" restraint mechanisms in the form of threaded pins 440, 441, which are inserted in and engaged with threaded holes 442, 443 in sidewalls of the opening 410. Prior to actuation of the restraint-equipped cupholder 400, as shown in FIG. 4A, threaded pins 440, 441 may be retracted within threaded holes 442, 443 so that tips of the threaded pins 440, 441 do not exert any significant force on cup 430 (e.g., the pins 440, 441 may not contact cup 430 at all, as is shown in FIG. 4A, or the pins 440, 441 may only minimally contact cup 430).

Restraint-equipped cupholder 400 also includes one or more actuators 450 that are configured to selectively alter the positions of the threaded pins 440, 441 in response to the state of an actuator signal 452 received from an event detection and restraint activation system (e.g., system 210, FIG. 2). For example, when the actuator signal 452 is not asserted, actuator 450 may allow the threaded pins 440, 441 to remain retracted within threaded holes 442, 443 (e.g., as shown in FIG. 4A). Conversely, when the actuator signal 452 is asserted, actuator 450 may change the position of the threaded pins 440, 441 so that the tips of the threaded pins 440, 441 contact the cup 430 with sufficient force to retain the cup 430 in the opening 410 (e.g., as shown in FIG. 4B). In other words, actuator 450 may activate the threaded pins 440, 441. For example, actuator 450 may cause the threaded pins 440, 441 to rotate within the threaded holes 442, 443 so that the tips of the threaded pins 440, 441 extend into the opening 410 and contact sides of the cup 430 to apply a significant restraining force to the cup 430. The threaded pins 440, 441 may include pressure sensors (not shown) at their tips, so that the threaded pins 440, 441 may provide feedback indicating applied pressure, in an embodiment, so that actuator 450 may adjust the threaded pins 440, 441 to a desired position (e.g., a position at which a magnitude of force applied by the threaded pins 440, 441 to the cup 430 is sufficient for the threaded pins 440, 441 to hold but not crush the cup 430). Desirably, the force applied by the threaded pins 440, 441 is selected so that unusually high gravitational forces and/or inertial forces imparted on the cup 430 during a collision or other triggering event do not cause the cup 430 to become dislodged from the restraint-equipped cupholder 400.

In an embodiment, and similar to the restraint-equipped cupholder 300 of FIG. 3, restraint-equipped cupholder 400 also may include an object presence sensor 460, which is configured to detect the presence of one or more objects (e.g., cup 430) within the opening 410. When object presence sensor 460 senses that one or more objects are present within the opening 410, the object presence sensor 460 asserts an object presence signal 462, which is communicated to the event detection and restraint activation system (e.g., system 210, FIG. 2), as discussed previously. Otherwise, when the object presence sensor 460 does not detect an object in opening 410, the object presence sensor 460 may deassert the object presence signal 462.

Figure 5:
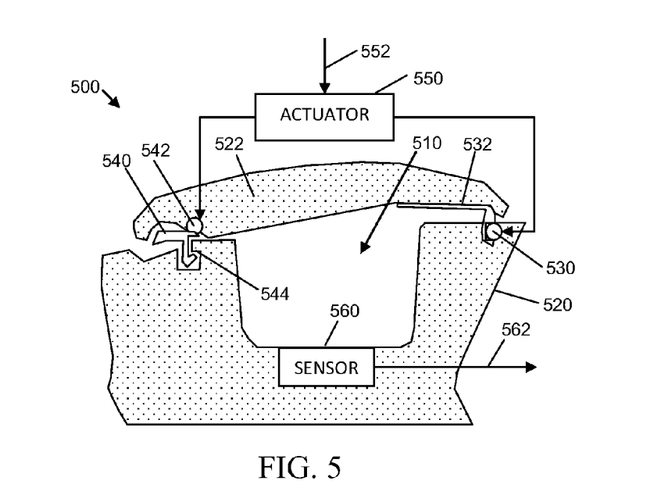
FIG. 5 is a cross-sectional side view of a restraint-equipped compartment with a hinged lid, in accordance with an example embodiment.

FIG. 5 is a cross-sectional side view of a restraint-equipped compartment 500 with a hinged lid 522, in accordance with another example embodiment. Restraint-equipped compartment 500 is similar to restraint-equipped cupholders 300, 400, in that restraint-equipped compartment 500 also includes a space 510 formed in a rigid body 520, where the space 510 is generally sized to receive and retain one or more objects (not shown). For example, restraint-equipped compartment 500 may correspond to a compartment within a center console (e.g., between front or rear, driver-side and passenger-side seats). A glove compartment also may be similarly equipped with restraint mechanisms, since a glove compartment also is essentially a lidded compartment. Similar restraint-equipped compartments 500 may be located elsewhere in the vehicle, as well. The volume of restraint-equipped compartment 500 (i.e., the space 510 that is bound by the body 520 and the lid 522, when the lid 522 is latched closed) is less than two cubic feet, in an embodiment, although the volume may be greater, in other embodiments.

Restraint-equipped compartment 500 also includes two restraint mechanisms in the form of a hinged connector that rotatably couples the lid 522 to the rigid body 520 and a hinged latch which selectively latches the lid 522 to the rigid body 520. More particularly, the hinged connector includes a hinge 530 coupled to the rigid body 520, and an extension 532 coupled to the hinge 530 and to the lid 522. Prior to actuation of the hinged connector, the lid 522 may be readily rotated, using a minimal force, to open or close the compartment 500, in order to enable access to the space 510 or to seal off the space 510 from the passenger compartment, respectively. Those of skill in the art would understand, based on the description herein, that an alternate embodiment may include a hinge that is coupled to the lid 522, and an extension coupled to the hinge and to the body 520.

The hinged latch includes a latch 540 that is coupled to the lid 522 with a hinge 542, and a strike surface 544 that defines a portion of an opening in the rigid body 520. Hinge 542 may include a torsion spring (or other type of spring), for example, so that the hinge 542 may be deflected from a default or equilibrium position when a force is applied to the hinge 542 (e.g., a force applied by pinching the hinge 542). Deflection from the default or equilibrium position causes the hinge 542 to move out of the way of otherwise interfering portions of the body 520 so that the hinge 542 may be snapped into engagement with the strike surface 544. Similarly, deflection from the default or equilibrium position enables the hinge 542 to be disengaged from the strike surface 544 to enable the lid 522 to be rotated open. When the hinge 542 is engaged with the strike surface 544, the hinge 542 holds the lid 522 closed over the compartment space 510. Prior to actuation of the hinged latch, the latch 540 may be readily engaged and disengaged from the strike surface 544, for example, by pinching the latch 540 so that the latch 540 rotates around the axis of the hinge's torsion spring. The torsion on hinge 542 when the latch 540 is engaged with the strike surface 544 is sufficient to retain the latch 540 in engagement with the strike surface 544 under normal operational circumstances. Those of skill in the art would understand, based on the description herein, that an alternate embodiment may include a hinged latch that is coupled to the body 520, and a corresponding strike surface that is formed in the lid 522.

Restraint-equipped compartment 500 also includes one or more actuators 550 that are configured to selectively alter the functioning of the hinged latch and/or hinged connector in response to the state of an actuator signal 552 received from an event detection and restraint activation system (e.g., system 210, FIG. 2). For example, when the actuator signal 552 is not asserted, actuator 550 may allow the hinged latch and hinged connector to operate normally without interference. Conversely, when the actuator signal 552 is asserted, actuator 550 may alter the operation of the hinged latch and/or hinged connector so that the hinged latch and/or hinged connector retain the lid 522 in a closed position over the compartment space 510 with greater than normal restraining force (i.e., actuator 550 may activate the hinged latch and/or hinged connector). For example, actuator 550 may increase the torque of the torsion spring of hinge 542 so that a significantly larger force is required to disengage the latch 540 from the strike surface 544 (e.g., from 10% to 200% larger than the normal force used to disengage the latch 540). The hinge 542 may be configured to provide feedback indicating a magnitude of applied torque, in an embodiment, so that actuator 550 may adjust the applied torque to a desired magnitude. In a further embodiment, actuator 550 may lock the hinge 530 into position, so that unusually high gravitational forces and/or inertial forces exerted on the lid 522 during a collision or other triggering event do not cause the lid 522 to rotate open to expose the compartment space 510, regardless of the presence or state of the hinged latch.

In an embodiment, and similar to the restraint-equipped compartments 300, 400 of FIGS. 3 and 4, restraint-equipped compartment 500 also may include an object presence sensor 560, which is configured to detect the presence of one or more objects (not shown) within the space 510. When object presence sensor 560 senses that one or more objects are present within the space 510, the object presence sensor 560 asserts an object presence signal 562, which is communicated to the event detection and restraint activation system (e.g., system 210, FIG. 2), as discussed previously. Otherwise, when the object presence sensor 560 does not detect an object in space 510, the object presence sensor 560 may deassert the object presence signal 562.

Figure 6A:
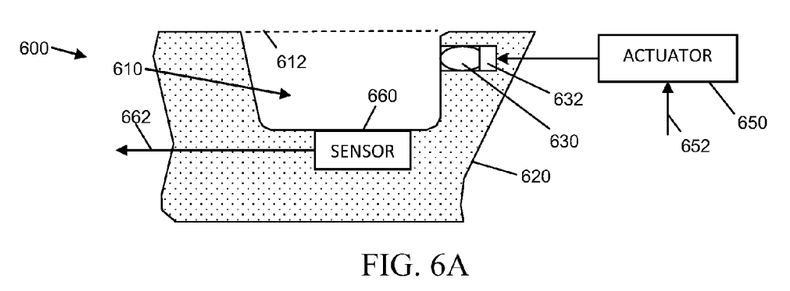
FIGS. 6A and 6B are cross-sectional side views of a restraint-equipped compartment with a deployable curtain airbag restraint in an undeployed state and a deployed state, respectively, in accordance with an example embodiment.
Figure 6B:
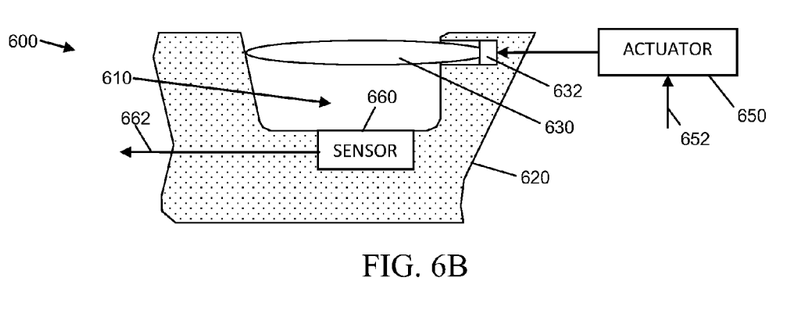

FIGS. 6A and 6B are cross-sectional side views of a restraint-equipped compartment 600 with a deployable curtain airbag restraint in an undeployed state (FIG. 6A) and a deployed state (FIG. 6B), respectively, in accordance with an example embodiment. Restraint-equipped compartment 600 is similar to restraint-equipped compartment 500, in that restraint-equipped compartment 600 also includes a space 610 formed in a rigid body 620, where the space 610 is generally sized to receive and retain one or more objects (not shown). However, restraint-equipped compartment 600 differs from restraint-equipped compartment 500, in that restraint-equipped compartment 600 does not include a lid (e.g., lid 522), so that an opening (indicated by line 612) is present between compartment space 610 and the passenger compartment. For example, restraint-equipped compartment 600 may correspond to a compartment within a center console (e.g., between front or rear, driver-side and passenger-side seats). Similar restraint-equipped compartments 600 may be located elsewhere in the vehicle, as well. The volume of restraint-equipped compartment 600 (i.e., the area defined by the bottom and sidewall surfaces of space 610, or the area below opening 612) is less than two cubic feet, in an embodiment, although the volume may be greater, in other embodiments.

Restraint-equipped compartment 600 also includes a restraint mechanism in the form of a small curtain airbag system coupled to the body 620 near the top boundary of space 610. More particularly, the curtain airbag system includes a curtain airbag 630 and an inflation mechanism 632. The curtain airbag 630 may be stowed within a stowage area in a sidewall of space 610 behind a flap or door (not shown) which is designed to break open under the force of the airbag 630 inflating. Inflation mechanism 632 is configured to rapidly inflate the curtain airbag 630, when activated. For example, in one embodiment, activation of inflation mechanism 632 triggers the ignition of a solid propellant gas generator, which rapidly inflates the airbag 630 with an inert gas, such as a gas composed primarily of nitrogen gas. In an alternate embodiment, activation of inflation mechanism 632 opens a valve (e.g., a pyrotechnic valve), which releases compressed gas (e.g., nitrogen and/or argon gas) into the airbag 630. For example, the curtain airbag system may be configured to achieve full inflation of the airbag 630 within about 20-30 milliseconds from activation.

Restraint-equipped compartment 600 also includes one or more actuators 650 that are configured to activate the curtain airbag system in response to assertion of an actuator signal 652 received from an event detection and restraint activation system (e.g., system 210, FIG. 2). For example, when the actuator signal 652 is not asserted, actuator 650 may refrain from activating the curtain airbag system and the airbag 630 may remain stowed within the stowage space (e.g., FIG. 6A). Conversely, when the actuator signal 652 is asserted, actuator 650 may activate the curtain airbag system by sending an activation signal to the inflation mechanism 632, which in turn rapidly inflates the airbag 630 so that it extends across and substantially covers opening 612 (FIG. 6B). When the airbag 630 is deployed, it functions to retain objects within space 610, thus restricting those objects from being propelled into the passenger compartment. According to an embodiment, the airbag 630 may include one or more small vents, which enable gas to escape from the airbag 630 after deployment. Alternatively, the airbag 630 may not include such vents.

In an embodiment, and similar to the restraint-equipped compartment 500 of FIG. 5, restraint-equipped compartment 600 also may include an object presence sensor 660, which is configured to detect the presence of one or more objects (not shown) within the space 610. When object presence sensor 660 senses that one or more objects are present within the space 610, the object presence sensor 660 asserts an object presence signal 662, which is communicated to the event detection and restraint activation system (e.g., system 210, FIG. 2), as discussed previously. Otherwise, when the object presence sensor 660 does not detect an object in space 610, the object presence sensor 660 may deassert the object presence signal 662.

According to a further embodiment, restraint-equipped compartment 600 also may include an additional sensor (not shown) configured to determine whether any object is extending through the plane that defines opening 612 (e.g., a hand reaching into space 610 or an overly large object extending upward through opening 612). In such an embodiment, the sensor may assert a safety disable signal that is provided to the inflation mechanism 632 and/or to the event detection and restraint activation system. In response, the inflation mechanism 632 may refrain from inflating the airbag 630 and/or the event detection and restraint activation system may refrain from asserting the actuator signal 652. This feature may reduce the possibility of potential physical injury from inflation of the airbag 630, and/or may reduce the possibility of the inflating airbag 630 jettisoning an object within opening 612 into the passenger compartment.

Figure 7A:
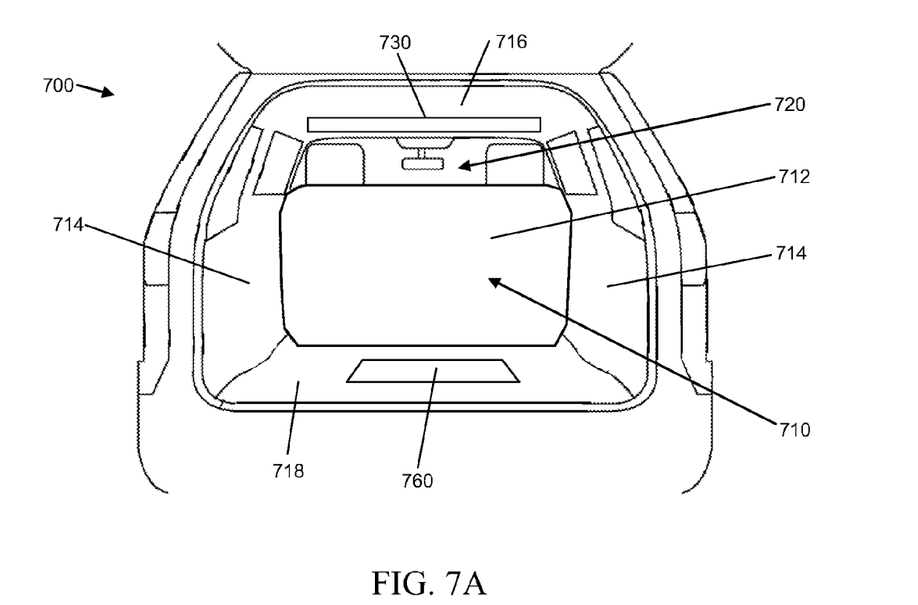
FIGS. 7A and 7B are rear views of a vehicle with a deployable curtain airbag system between a restraint-equipped cargo area and a passenger compartment, where the deployable curtain airbag system is shown with an airbag in an undeployed state and a deployed state, respectively, in accordance with an example embodiment.
Figure 7B:
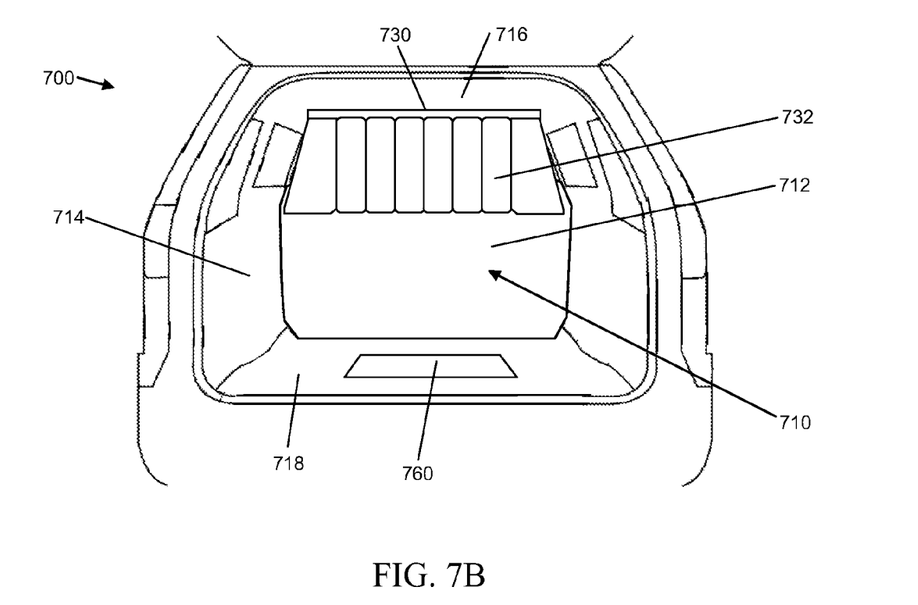

FIGS. 7A and 7B are rear views of a vehicle 700 with a deployable curtain airbag system 730 between a restraint-equipped cargo area 710 (e.g., cargo area 143, FIG. 1) and a passenger compartment (e.g., passenger compartment 120, FIG. 1), where the deployable curtain airbag system 730 is shown with an airbag 732 in an undeployed state (FIG. 7A) and a deployed state (FIG. 7B), respectively, in accordance with an example embodiment. Essentially, restraint-equipped cargo area 710 may be considered to be a large restraint-equipped compartment, and accordingly the restraint-equipped cargo area 710 of FIGS. 7A and 7B has significant similarities to restraint-equipped compartment 600.

The space defining restraint-equipped cargo area 710 is defined by seatbacks 712 (i.e., the backs of the rear row of seats within the passenger compartment), rearward portions of vehicle sidewalls 714 (including windows in the sidewalls 714), a rearward portion of vehicle roof 716, and a rearward portion of vehicle floor 718. As shown in FIG. 7A, prior to deployment of airbag 732, an opening 720 is present between restraint-equipped cargo area 710 and the passenger compartment. The volume of restraint-equipped cargo area 700 is between about 20 cubic feet to about 125 cubic feet, in an embodiment, although the volume may be greater or less, in other embodiments. For example, an area between rear seats and a rear window of a relatively small automobile (including sedans, hatchbacks, and so on) may be considered to be a relatively small cargo area that may be equipped with a restraint, in accordance with an embodiment. Alternatively, an area between front passenger cabin seats and a rear wall of a large recreational vehicle may be considered to be a relatively large cargo area, in accordance with another embodiment.

Restraint-equipped cargo area 700 includes a restraint mechanism in the form of a curtain airbag system 730 coupled to the interior of the roof 716 above opening 720, in an embodiment. More particularly, the curtain airbag system includes a curtain airbag 732 and an inflation mechanism (not shown). The curtain airbag 732 may be stowed within a stowage area in the roof 716 behind a flap or door (not shown) which is designed to break open under the force of the airbag 732 inflating. The inflation mechanism is configured to rapidly inflate the curtain airbag 732, when activated. For example, activation of the inflation mechanism may trigger the ignition of a solid propellant gas generator, or may open a valve, which releases compressed gas into the airbag 732, as discussed previously. For example, the curtain airbag system may be configured to achieve full inflation of the airbag 732 within about 20-30 milliseconds from activation.

Restraint-equipped cargo area 700 also includes one or more actuators (not shown) that are configured to activate the curtain airbag system in response to assertion of an actuator signal received from an event detection and restraint activation system (e.g., system 210, FIG. 2). For example, when the actuator signal is not asserted, the actuator may refrain from activating the curtain airbag system and the airbag 732 may remain stowed within the stowage space (e.g., FIG. 7A). Conversely, when the actuator signal is asserted, the actuator may activate the curtain airbag system by sending an activation signal to the inflation mechanism, which in turn rapidly inflates the airbag 732 so that it extends across and substantially covers opening 720 (FIG. 7B). When the airbag 732 is deployed, it functions to retain objects within cargo area 710, thus restricting those objects from being propelled into the passenger compartment. Preferably, the airbag 732 is formed from a material that is sufficiently puncture resistant, so that typical objects that may be carried in the vehicle are not likely to pierce or tear the airbag 732 while it is inflated (e.g., when the objects may impact the airbag 732 at high force (e.g., 2 to 10 Newtons or more) during a collision). For example, in embodiments in which the airbag 732 is formed from a woven material, the material may be very tightly woven, may include a coating that increases the puncture resistance of the airbag 732, and/or may otherwise be configured to have high puncture resistance. According to an embodiment, the airbag 732 may include one or more small vents, which enable gas to escape from the airbag 732 after deployment. Alternatively, the airbag 732 may not include such vents.

In an embodiment, and similar to the restraint-equipped compartment 600 of FIG. 6, restraint-equipped compartment 700 also may include an object presence sensor 760, which is configured to detect the presence of one or more objects (not shown) within the cargo area 710. When object presence sensor 760 senses that one or more objects are present within the cargo area 710, the object presence sensor 760 asserts an object presence signal, which is communicated to the event detection and restraint activation system (e.g., system 210, FIG. 2), as discussed previously. Otherwise, when the object presence sensor 760 does not detect an object in cargo area 710, the object presence sensor 760 may deassert the object presence signal.

According to a further embodiment, restraint-equipped compartment 700 also may include an additional sensor (not shown) configured to determine whether any object is extending through the plane that defines opening 720 (e.g., an arm reaching into cargo area 710 or an object extending through opening 720). In such an embodiment, the sensor may assert a safety disable signal that is provided to the inflation mechanism and/or to the event detection and restraint activation system. In response, the inflation mechanism may refrain from inflating the airbag 732 and/or the event detection and restraint activation system may refrain from asserting the actuator signal. This feature may reduce the possibility of potential physical injury from inflation of the airbag 732, and/or may reduce the possibility of the inflating airbag 732 jettisoning an object within opening 720 into the passenger compartment.

Figure 8:
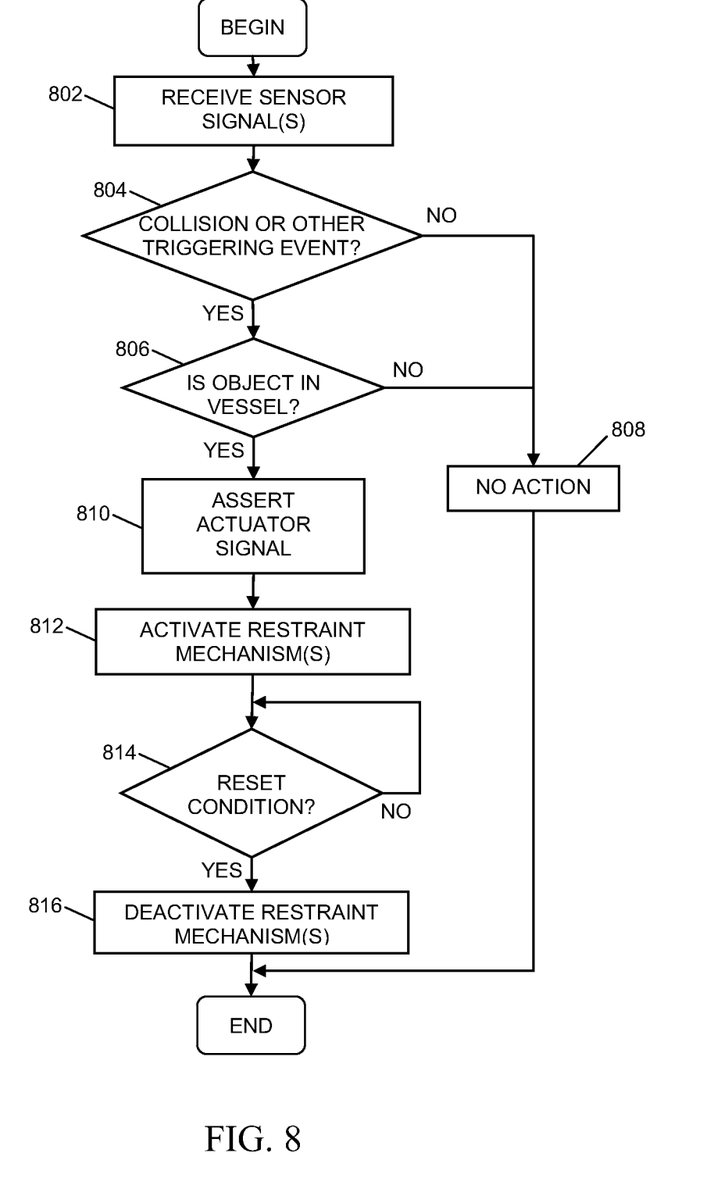
FIG. 8 is a flowchart of a method of operating an object restraint system, in accordance with an example embodiment.

FIG. 8 is a flowchart of a method of operating a vehicle-borne object restraint system (e.g., system 200, FIG. 2), in accordance with an example embodiment. The method may begin, in block 802, by receiving (e.g., by processing subsystem 214) sensor signals (e.g., from sensor subsystem 212) that indicate a magnitude of a sensed condition being experienced by the vehicle. For example, as discussed previously in detail, the sensor signals may be produced by a variety of different types of sensors. Further, the sensed conditions may include linear velocity, angular velocity, linear acceleration, angular acceleration, linear deceleration, and/or angular deceleration of the vehicle. In addition or alternatively, the sensed conditions may include angular velocity, acceleration, or deceleration of the vehicle's wheels, force or pressure imparted to a brake pedal, impact by an object outside of the vehicle, and/or pressure applied to a door or other portion of the vehicle.

In block 804, a determination is made (e.g., by processing subsystem 214) whether or not the sensor signals indicate that a collision or other triggering event is occurring. For example, a determination may be made that a collision or other triggering event is occurring when the magnitude of one of the sensed signals exceeds a corresponding threshold. For example, the sensor signals may indicate that a change of linear or angular momentum of the vehicle exceeds a first predetermined threshold. As one specific example, an accelerometer may indicate a magnitude of deceleration of the vehicle. When the deceleration magnitude exceeds a threshold (e.g., deceleration corresponding to a 20 kilometer/hour or greater barrier collision), a determination may be made that a collision is occurring. In other embodiments, the sensor signals may indicate that wheel speed deceleration exceeds a predetermined threshold, an applied braking force exceeds a predetermined threshold, an impact is detected by an impact sensor, and/or a pressure detected by a pressure sensor exceeds a predetermined threshold. When no determination is made that a collision or other triggering event is occurring, the object restraint system may take no action (i.e., may refrain from activating an object restraint), as indicated by block 808.

When a determination is made that a collision or other triggering event is occurring, a determination may be made (e.g., by processing subsystem 214) whether or not an object is present in a restraint-equipped vessel (e.g., restraint-equipped vessels 300, 400, 500, 600, 700, FIGS. 3-7), in block 806. For example, this determination may be made based on whether or not an object presence signal from an object presence sensor (e.g., sensors 360, 460, 560, 660, 760, FIGS. 3-7) is asserted. When a determination is made that no object is present within a restraint-equipped vessel, the object restraint system may take no action (i.e., may refrain from activating an object restraint associated with the empty vessel), as indicated by block 808. In an alternate embodiment, decision block 806 may be excluded from the method.

When a determination is made that an object is present within a restraint-equipped vessel, an actuator signal may be asserted (e.g., by processing subsystem 214), in block 810. The asserted actuator signal is received by an actuator (e.g., actuators 350, 450, 550, 650, FIGS. 3-6), and in response, the actuator activates one or more restraint mechanisms for one or more restraint-equipped vessels, in block 812. As discussed above, activation of the restraint mechanism(s) function to retain objects within the vessel(s) so that the objects are less likely to become potentially-injurious projectiles during a collision or other triggering event.

According to an embodiment, after activation of a restraint mechanism, a determination may be made whether or not a reset condition has occurred, in block 814. For example, it may be desirable to deactivate a restraint mechanism once the collision or the other triggering event is over. Such a determination may be made based on evaluation of additional sensor signals, based on the expiration of a predetermined time period, based on the receipt of a reset signal, or in some other manner. When a determination has been made that a reset condition has occurred, the restraint mechanism(s) may be deactivated, in block 816 (e.g., by deasserting the actuator signal(s). The method may then end.

An embodiment of an object restraint system contained in a vehicle for transporting people includes a vessel, a sensor subsystem, a processing subsystem, a restraint mechanism, and an actuator. The vessel, which is distinct from a passenger compartment of the vehicle, is coupled to the vehicle and is configured to hold one or more objects. The sensor subsystem is coupled to the vehicle and is configured to produce a sensor signal indicating a magnitude of a sensed condition. The processing subsystem is configured to receive the sensor signal, and to assert an actuator signal when the sensor signal indicates that a triggering event has occurred. The restraint mechanism is coupled to the vessel and is configured, when activated, to retain the one or more objects within the vessel and to restrict the one or more objects from entering the passenger compartment. The actuator is coupled to the restraint mechanism and to the processing subsystem, and is configured to receive the actuator signal and to activate the restraint mechanism in response to assertion of the actuator signal.

In a further embodiment, the sensed condition is selected from linear velocity, angular velocity, linear acceleration, angular acceleration, linear deceleration, angular deceleration, force, impact, and pressure, and the triggering event is selected from a change of momentum exceeding a first predetermined threshold, a wheel speed deceleration exceeding a second predetermined threshold, an applied braking force exceeding a third predetermined threshold, detection of an impact, and detection of a pressure exceeding a fourth predetermined threshold.

In a further embodiment, the sensor subsystem includes at least one accelerometer, the sensor signal indicates a magnitude of acceleration or deceleration of the vehicle, and the predetermined threshold corresponds to an acceleration or deceleration magnitude that is consistent with a collision of the vehicle.

An embodiment of a method for restraining objects in a vehicle for transporting people includes receiving, by a processing subsystem, a sensor signal indicating a magnitude of a sensed condition being experienced by the vehicle, and asserting, by the processing subsystem, an actuator signal when the sensor signal indicates that a triggering condition has occurred. The method further includes receiving, by an actuator, the actuator signal, and activating, by the actuator, a restraint mechanism in response to assertion of the actuator signal. The restraint mechanism is coupled to a vessel that is configured to hold one or more objects, the vessel is distinct from a passenger compartment of the vehicle, and the restraint mechanism is configured, when activated, to retain the one or more objects within the vessel and to restrict the one or more objects from entering the passenger compartment.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

The foregoing description refers to elements or nodes or features being "connected" or "coupled" together. As used herein, unless expressly stated otherwise, "connected" means that one element is directly joined to (or directly communicates with) another element, and not necessarily mechanically Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the foregoing detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An object restraint system contained in a vehicle for transporting people, the system comprising:
a vessel coupled to the vehicle and configured to hold one or more objects, wherein the vessel is distinct from a passenger compartment of the vehicle;
a sensor subsystem coupled to the vehicle and configured to produce a sensor signal indicating a magnitude of a sensed condition;
an object presence sensor coupled to the vessel, wherein the object presence sensor is configured to detect whether or not an object is present within the vessel, and to provide an object presence signal that indicates whether or not the object is present within the vessel;
a processing subsystem configured to receive the sensor signal and the object presence signal, and to assert an actuator signal when the magnitude of the sensed condition indicates that deceleration of the vehicle has exceeded a first predetermined threshold, and wherein the processing subsystem is further configured to refrain from asserting the actuator signal when the object presence signal indicates that the object is not present within the vessel;
a restraint mechanism coupled to the vessel and configured, when activated, to retain the one or more objects within the vessel and to restrict the one or more objects from entering the passenger compartment; and
an actuator coupled to the restraint mechanism and to the processing subsystem, and configured to receive the actuator signal and to activate the restraint mechanism in response to assertion of the actuator signal.

2. The system of claim 1, wherein
the sensed condition is selected from linear velocity, angular velocity, linear acceleration, angular acceleration, linear deceleration, angular deceleration, force, impact, and pressure, and
wherein the processing subsystem also is configured to assert the actuator signal when the sensor signal indicates that a triggering event has occurred, wherein the triggering event is selected from a wheel speed deceleration exceeding a second predetermined threshold, an applied braking force exceeding a third predetermined threshold, detection of an impact, detection of a pressure exceeding a fourth predetermined threshold, acceleration of the vehicle exceeding a fifth predetermined threshold, and a change of momentum exceeding a sixth predetermined threshold.

3. The system of claim 1, wherein the vessel comprises a compartment, and the restraint mechanism comprises a lid that covers the compartment, and a hinge that rotatably couples the lid to the compartment, and wherein the actuator is configured to restrain the hinge from rotating in response to assertion of the actuator signal.

4. The system of claim 1, wherein the vessel comprises a compartment, and the restraint mechanism comprises a lid that covers the compartment, and a latch which, when engaged with a strike surface, holds the lid closed over the compartment, and wherein the actuator is configured to restrain the latch from disengaging from the strike surface in response to assertion of the actuator signal.

5. The system of claim 1, wherein the vessel comprises a compartment, and the restraint mechanism comprises a curtain airbag configured, when deployed, to cover an opening into the compartment, and wherein the actuator is configured to deploy the airbag in response to assertion of the actuator signal.

6. The system of claim 1, wherein the vessel comprises a cargo area of the vehicle, and the restraint mechanism comprises a curtain airbag configured, when deployed, to cover an opening between the cargo area and the passenger compartment, and wherein the actuator is configured to deploy the airbag in response to assertion of the actuator signal.

7. An object restraint system contained in a vehicle for transporting people, the system comprising:
a vessel coupled to the vehicle and configured to hold one or more objects, wherein the vessel is distinct from a passenger compartment of the vehicle;
a sensor subsystem coupled to the vehicle and configured to produce a sensor signal indicating a magnitude of a sensed condition, wherein the sensor subsystem includes at least one accelerometer, and wherein the sensor signal indicates a magnitude of acceleration or deceleration of the vehicle;
an object presence sensor coupled to the vessel, wherein the object presence sensor is configured to detect whether or not an object is present within the vessel, and to provide an object presence signal that indicates whether or not the object is present within the vessel;
a processing subsystem configured to receive the sensor signal and the object presence signal, and to assert an actuator signal when the sensor signal indicates that the magnitude of acceleration or deceleration of the vehicle exceeds a predetermined threshold that corresponds to an acceleration or deceleration magnitude that is consistent with a collision of the vehicle, and wherein the processing subsystem is further configured to refrain from asserting the actuator signal when the object presence signal indicates that the object is not present within the vessel;
a restraint mechanism coupled to the vessel and configured, when activated, to retain the one or more objects within the vessel and to restrict the one or more objects from entering the passenger compartment; and
an actuator coupled to the restraint mechanism and to the processing subsystem, and configured to receive the actuator signal and to activate the restraint mechanism in response to assertion of the actuator signal.

8. An object restraint system contained in a vehicle for transporting people, the system comprising:
a vessel coupled to the vehicle and configured to hold one or more objects, wherein the vessel is distinct from a passenger compartment of the vehicle, and wherein the vessel comprises a cupholder;
a sensor subsystem coupled to the vehicle and configured to produce a sensor signal indicating a magnitude of a sensed condition, including a magnitude of deceleration of the vehicle;
a processing subsystem configured to receive the sensor signal, and to assert an actuator signal when the sensor signal indicates that deceleration of the vehicle has exceeded a first predetermined threshold;
a restraint mechanism coupled to the vessel and configured, when activated, to retain the one or more objects within the vessel and to restrict the one or more objects from entering the passenger compartment, wherein the restraint mechanism comprises a structure configured to restrict an object within the cupholder from being jettisoned from the cupholder when the restraint mechanism is actuated; and an actuator coupled to the restraint mechanism and to the processing subsystem, and configured to receive the actuator signal and to activate the restraint mechanism in response to assertion of the actuator signal.

9. The system of claim 8, wherein the restraint mechanism is a hinge that may be restrained from rotating when actuated.

10. An object restraint system contained in a vehicle for transporting people, the system comprising:
a vessel coupled to the vehicle and configured to hold one or more objects, wherein the vessel is distinct from a passenger compartment of the vehicle;
a sensor subsystem coupled to the vehicle and configured to produce a sensor signal indicating a magnitude of a sensed condition;
an object presence sensor coupled to the vessel, wherein the object presence sensor is configured to detect whether or not an object is present within the vessel, and to provide an object presence signal that indicates whether or not the object is present within the vessel;
a processing subsystem configured to receive the sensor signal and the object presence signal, and to assert an actuator signal when the sensor signal indicates that a triggering event has occurred, and wherein the processing subsystem is further configured to refrain from asserting the actuator signal when the object presence signal indicates that the object is not present within the vessel;
a restraint mechanism coupled to the vessel and configured, when activated, to retain the one or more objects within the vessel and to restrict the one or more objects from entering the passenger compartment; and
an actuator coupled to the restraint mechanism and to the processing subsystem, and configured to receive the actuator signal and to activate the restraint mechanism in response to assertion of the actuator signal;
an airbag deployment system configured to detect a collision of the vehicle, and to deploy one or more airbags in the event of the collision for the purpose of cushioning passengers within the passenger compartment from impact with vehicle components that are exposed within the passenger compartment,
wherein the sensor subsystem and the processing subsystem form portions of the airbag deployment system, and wherein the processing subsystem is configured to assert the actuator signal concurrently with asserting an airbag deployment signal that causes deployment of the one or more airbags.

11. A method for restraining objects in a vehicle for transporting people, the method comprising the steps of:
detecting, by an object presence sensor, whether or not an object is present within a vessel that is coupled to the vehicle and configured to hold one or more objects, wherein the vessel is distinct from a passenger compartment of the vehicle;
providing, by the object presence sensor, an object presence signal that indicates whether or not the object is present within the vessel;
receiving, by a processing subsystem, the object presence signal and a sensor signal indicating a magnitude of a sensed condition being experienced by the vehicle;
asserting, by the processing subsystem, an actuator signal when the magnitude of the sensed condition indicates that deceleration of the vehicle has exceeded a first predetermined threshold, and refraining from asserting the actuator signal, by the processing subsystem, when the object presence signal indicates that the object is not present within the vessel;
receiving, by an actuator, the actuator signal; and
activating, by the actuator, a restraint mechanism in response to assertion of the actuator signal, wherein the restraint mechanism is coupled to the vessel, and the restraint mechanism is configured, when activated, to retain the object within the vessel and to restrict the object from entering the passenger compartment.

12. The method of claim 11, wherein
the sensed condition is selected from linear velocity, angular velocity, linear acceleration, angular acceleration, linear deceleration, angular deceleration, force, impact, and pressure, and
the processing subsystem also is configured to assert the actuator signal when the sensor signal indicates that a triggering event has occurred, wherein the triggering event is selected from a wheel speed deceleration exceeding a second predetermined threshold, an applied braking force exceeding a third predetermined threshold, detection of an impact, detection of a pressure exceeding a fourth predetermined threshold, and acceleration of the vehicle exceeding a fifth predetermined threshold.

13. The method of claim 11, wherein the vessel comprises a compartment, the restraint mechanism comprises a lid that covers the compartment, and a hinge that rotatably couples the lid to the compartment, and wherein the actuator restrains the hinge from rotating in response to assertion of the actuator signal.

14. The method of claim 11, wherein the vessel comprises a compartment, the restraint mechanism comprises a lid that covers the compartment, and a latch which, when engaged with a strike surface, holds the lid closed over the compartment, and wherein the actuator restrains the latch from disengaging from the strike surface in response to assertion of the actuator signal.

15. The method of claim 11, wherein the vessel comprises a compartment, the restraint mechanism comprises a curtain airbag configured, when deployed, to cover an opening into the compartment, and wherein the actuator deploys the airbag in response to assertion of the actuator signal.

16. The method of claim 11, wherein the vessel comprises a cargo area of the vehicle, the restraint mechanism comprises a curtain airbag configured, when deployed, to cover an opening between the cargo area and the passenger compartment, and wherein the actuator deploys the airbag in response to assertion of the actuator signal.

17. A method for restraining objects in a vehicle for transporting people, the method comprising the steps of:
receiving, by a processing subsystem, a sensor signal indicating a magnitude of a sensed condition being experienced by the vehicle, including a magnitude of deceleration of the vehicle;
asserting, by the processing subsystem, an actuator signal when the sensor signal indicates that deceleration of the vehicle has exceeded a first predetermined threshold;
receiving, by an actuator, the actuator signal; and
activating, by the actuator, a restraint mechanism in response to assertion of the actuator signal, wherein the restraint mechanism is coupled to a vessel that is configured to hold one or more objects, the vessel is distinct from a passenger compartment of the vehicle, the vessel comprises a cupholder, and the restraint mechanism is configured, when activated, to retain the one or more objects within the vessel and to restrict the one or more objects from entering the passenger compartment, wherein the restraint mechanism comprises a structure configured to restrict an object within the cupholder from being jettisoned from the cupholder, and wherein the actuator causes the structure to restrict the object in response to assertion of the actuator signal.

18. A method for restraining objects in a vehicle for transporting people, the method comprising the steps of:
   detecting, by an object presence sensor, whether or not an object is present within the vessel:
   providing, by the object presence sensor, an object presence signal that indicates whether or not the object is present within the vessel;
   receiving, by a processing subsystem, the object presence signal and a sensor signal indicating a magnitude of a sensed condition being experienced by the vehicle;
   asserting, by the processing subsystem, an actuator signal when the sensor signal indicates that a triggering condition has occurred, and refraining from asserting the actuator signal, by the processing subsystem, when the object presence signal indicates that the object is not present within the vessel;
   receiving, by an actuator, the actuator signal;
   activating, by the actuator, a restraint mechanism in response to assertion of the actuator signal, wherein the restraint mechanism is coupled to a vessel that is configured to hold one or more objects, the vessel is distinct from a passenger compartment of the vehicle, and the restraint mechanism is configured, when activated, to retain the one or more objects within the vessel and to restrict the one or more objects from entering the passenger compartment;
   detecting a collision of the vehicle; and
   in response to detecting the collision, asserting an airbag deployment signal concurrently with asserting the actuator signal, wherein the airbag deployment signal causes deployment of one or more airbags for the purpose of cushioning passengers within the passenger compartment from impact with vehicle components that are exposed within the passenger compartment.

* * * * *